United States Patent Office 3,594,347
Patented July 20, 1971

3,594,347
POLYESTERS CONTAINING ARYL PHOSPHINATES
Stanley D. Lazarus, Petersburg, and Ian C. Twilley, Chester, Va., assignors to Allied Chemical Corporation, New York, N.Y.
No Drawing. Filed Sept. 5, 1968, Ser. No. 757,770
Int. Cl. C08g 17/04, 51/58
U.S. Cl. 260—45.75
24 Claims

ABSTRACT OF THE DISCLOSURE

Linear, fiber-forming polyesters of reduced color and resistant to yellowing caused by actinic or thermal degradation are prepared by providing a small but effective amount of certain aryl phosphinic acids or salts thereof in the polyester.

---

This invention relates to linear, fiber-forming polyesters of reduced color and resistant to yellowing caused by actinic or thermal degradation, said polyesters containing a small but effective amount of certain aryl phosphinic acids or salts thereof. According to the present invention the phosphinic compounds are introduced into the polyester in a number of different ways, such as by their use as catalysts for direct esterification, ester interchange, or polymerization.

High molecular weight linear polyesters of high melting point are generally produced from an aromatic (aryl) dicarboxylic acid, such as terephthalic acid or naphthalene dicarboxylic acid or their ester-forming derivatives, with glycols by means of a two-stage reaction. The first stage is an esterification reaction to, for example, bis-hydroxyethylterephthalate (bis-HET); in the second stage the monomer (e.g., bis-HET) thus produced is polymerized to a linear polyester under reduced pressure at elevated temperatures. Still another conventional method for making linear, fiber-forming polyesters involves the abovementioned ester interchange reaction beginning with a dialkylterephthalate and a glycol to form, in the case of dimethylterephthalate and ethylene glycol, the corresponding bis-HET and methanol.

Although various catalysts have been disclosed as being effective for accelerating the rate of reaction in the justmentioned direct esterification and ester interchange methods, as well as for enhancing the rate of polymerization of the resulting products thereof, unfortunately these catalysts very often cause undesirable side reactions. For instance, it is difficult to secure from glycol and terephthalic acid or its dialkyl esters, under acceptable commercial conditions, a polyethylene terephthalate product of satisfactory quality which, say, has high intrinsic viscosity, is free of objectionable coloration, and is capable of being formed, as by extrusion, into useful filaments and film. In other words, some catalysts, while being effective to a certain extent in catalyzing both the first stage of monomer formation and the subsequent stage of polymerization, cause discoloration of the final polymer product obtained, or later contribute to the progressive deterioration of the color of the polymer under the influence of heat, ultraviolet light, or oxidation. Heretofore, for instance, in order to offset the poor color properties engendered by such catalysts, it has been found necessary to incorporate special stabilizing agents into the polymer compositions.

Pursuant to the instant invention, however, a very desirable, straightforward way has been found to produce linear, fiber-forming polyesters of reduced color and resistant to yellowing. It has been discovered that the presence of a small but effective amount of an aryl phosphinic acid or its salt of the type contemplated herein quite surprisingly and very efficiently provides the reduced color and resistance to discoloration properties heretofore zealously sought after by the art. Furthermore, these property enhancements are achieved while avoiding effects deleterious to the property profile of the resulting polyester. For example, it is found that even in the presence of, say, an aryl phosphinic acid moiety high molecular weight polymers are achieved, particularly when concentrations are controlled as taught herein.

The aryl phosphinic acids and salts of the present invention have the formula:

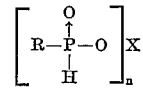

wherein R is aryl or alk($C_1$-$C_{12}$)aryl, X is H, a metal, $NH_4$ or quaternary ammonium cation and $n$ is a value from 1 to 4 and represents the valence of H or of the cation X.

Typical aryl phosphinic acids and salts suitable for the present invention include:

phenylphosphinic acid
naphthylphosphinic acid
sodium phenylphosphinate
potassium phenylphosphinate
magnesium phenylphosphinate
calcium phenylphosphinate
barium phenylphosphinate
manganous phenylphosphinate
aluminum phenylphosphinate
stannous phenylphosphinate
stannic phenylphosphinate
potassium p-dodecyl phenylphosphinate
sodium p-dimethyl aminophenylphosphinate
tetramethyl ammonium phenylphosphinate The phosphinic acids or their salts are generally employed in concentrations between 0.01 and 0.5 "mol percent," i.e., mol percent as used herein means mol per 100 mols of aromatic moiety in the final polymer. By aromatic moiety is meant the aryl or substituted aryl moiety derived from the dicarboxylic acid or ester monomer.

Where the cation of the phosphinate salt is the same as that of a catalyst commonly used for direct esterification, ester interchange or polycondensation, the salt itself may be used as the catalyst or in conjunction with such conventional catalysts. Where conventional catalysts containing these catalytically active cations are employed for direct esterification, ester interchange or condensation polymerization, the phosphinic acids contemplated herein may be used in lieu of their salts, thus effecting the reduction of color and providing resistance to yellowing in the final polymer product.

As is evident from the above, the additive compounds of the present invention may be introduced at almost any time prior to or during final polymerization. If added as a condensation catalyst, the prepolymer reduced viscosity should be less than about 0.2. The preferred amount of phosphinic acid or salt thereof introduced is between about 0.05 to 0.3 mol percent.

The additive compounds given hereinabove are illustrative of the type aryl and alkaryl phosphinic acids and salts contemplated herein, which compounds are miscible in molten polyester, thus avoiding nubs in the final filament product and/or delustering of same. Phosphinate salts of metals of Groups Ia, IIa, IIb, IIIb, IVa, IVb, Vb and VIIa of the periodic table (Reference: Cotton & Wilkinson, Advanced Organic Chemistry, John Wiley, page 30, 1962) having these solvent properties are suitable, as well as salts wherein X is amomnium or a quaternary ammonium cation, as indicated above. As will be seen hereinafter, preferred cations are the alkali metals, alkaline earth metals, manganese, zinc, chromium, cadmium, lead, antimony, arsenic, tin, germanium, aluminum, copper, and the like.

It has been found, according to the present invention, that the alkali metal and alkaline earth metal salts, for example, as well as the ammonium and quaternary ammonium salts, of aryl phosphinic acids, are particularly desirable when used in small but effective amounts as catalysts for the direct esterification process, such as in the reaction of ethylene glycol and terephthalic acid to produce bis-hydroxyethylterephthalate and/or prepolymer intermediates before ploycondensation to procure the desirable product polyester of the present invention.

Manganese, zinc, chromium and cadmium salts of the aryl phosphinic acids, for instance, are particularly suitable for catalyzing the ester interchange reaction while at the same time, when present in small but effective quantities, providing the color properties which distinguish the polyester compositions of the present invention.

It is also contemplated herein to use aryl phosphinic acid salts of lead, antimony, arsenic, tin, germanium and other similar aryl phosphinic acid salts to catalyze the polymerization reaction and thus introduce the desired amount of anti-discolorant into the product polyester.

Another method of achieving the objects of the present invention is merely to combine non-catalytic or weakly-catalytic metal salts of aryl phosphinic acids (e.g., aluminum salts, copper salts, or the like) with metals of the type discussed hereinbefore (such as calcium, zinc, manganese, tin, antimony, and the like) which are used conventionally in the preparation of polyesters from their monomer reactants or in the preparation of esterification of ester interchange intermediates.

The person skilled in the art will appreciate the fact that still other methods of introducing the additive compounds of the type described herein are within the purview of the present invention and contemplated herein. For example, catalytically-active salts of the aryl phosphinic acids may be used in conjunction with metallic copper, aluminum, or the like, so long as a small but effective amount of additive compound is present in the ultimate polymer. Another alternative involves introducing the requisite amount of phosphinic acid or its corresponding salt during polycondensation, etc.

The reduced viscosity of polymers, as employed in this specification, is determined by viscosity measurements carried out on a sample of polymer dissolved in purified ortho-chlorophenol containing 0.1 percent water, at 25° C. and at a concentration of 0.5 percent. Employing a standard Cannon-Fenske 150 bore viscometer, the flow time of the polymer solution ($t_p$) is measured relative to the flow time of the solvent ($t_s$), and the reduced viscosity is calculated using the following equation.

$$n_{red} = \frac{n_r - 1}{C}$$

where:

$n_{red}$ = reduced viscosity
C = concentration of dissolved polymer in grams/100 ml.
$n_r$ = relative viscosity = $t_p/t_s$ The color of polyester prepared in accordance with this invention is determined by means of a device for measuring color known as the "Color-Eye" photometer, Model 500016, manufactured by Instrument Development Laboratories, Inc., Boston, Mass. With this instrument, the percentage light reflections form a polymer sample in yarn or powder form are successively measured after passing through amber, blue, and green filters; the three readings obtained (A, B, G) are used to determine the yellowness index of the sample (YI) employing the formula:

$$YI = \left[\frac{A-B}{G} \times 100 + 100\right] \times 1.2$$

YI values above 100 correspond to yellowness; e.g., about 110 represents a distinct yellow cast; a sample with YI of 105 is just faintly yellow; and values near 100 mean colorless. Values below 100 correspond to bluish tints.

To determine the stability of the polyester of this invention toward the degradative effects of heat, the polymer sample is heated in an air circulating oven at 165° C. for 100 hours. The yellowness index of the exposed sample is then measured and compared with that of the original sample prior to exposure.

To determine the effect of ultraviolet light on the polyester, a sample of yarn is placed in an enclosed conventional apparatus known as a Fadeometer, which contains six ultraviolet lamps of different wave lengths covering the range of 2200 to 4000 angstroms, and said sample is rotationally exposed in the Fadeometer for 96 hours at room temperature. The yellowness index of the exposed sample is measured and compared with that of the original sample prior to exposure.

In order to more fully illustrate the nature of this invention and the manner of practicing same, the following examples are presented. These are presented as preferred illustrative embodiments and are not to be construed as limitative of the scope of the invention. All values given, referring to quantities employed, unless otherwise stated, are by weight or parts by weight.

EXAMPLE I

A 5-gallon kettle is used for the esterification and polymerization reaction, the kettle being equipped with a Dowtherm heated jacket, a steam heated condenser, a double spiral agitator, an extrusion valve, a vapor valve and reflux valves for removal or return of condensate. The Dowtherm temperature is controlled by means of a temperature-sensing and control device operating in conjunction with an electric heater.

The kettle is charged with 15 pounds of purified terephthalic acid, 16 pounds 14 ounces of purified ethylene glycol and 13.6 grams of aluminum phenyl phosphinate (representing 0.2% of the weight of the terephthalic acid or 0.074 mol percent, i.e., mol per 100 mols of aromatic moiety in the final polymer). With continuous agitation and by maintaining the temperature at 260° C. in the sealed kettle, the pressure builds up to 40 pounds per square inch gauge in 1 hour and 45 minutes. The vapor and reflux valves are then opened, permitting the pressure to fall to 35 pounds per square inch gauge. Refluxing is continued for 4 hours while pressure in excess of 35 pounds per square inch gauge is bled off through the vapor valve. The pressure is then bled off to atmospheric and nitrogen is swept over the melt at a rate of 0.03 cubic feet (measured at standard temperature and pressure) per hour per square foot of surface for a 45-minute period.

The temperature of the Dowtherm is then raised to 280° C. and a vacuum pump is connected to the system. A vacuum of 0.5 millimeter mercury is maintained. After 3 hours of polymerization under vacuum, nitrogen is introduced into the kettle to a pressure of 30 pounds per square inch gauge. The agitator is turned off and an extrusion valve at the bottom of the kettle is opened. The polymer is extruded into a quench trough filled with ice water, and the resultant strands are taken up on a reel. The polymer strands are fed through a conventional Wiley mill and converted into cylindrical pellets about ¼-inch long and ⅛-inch in diameter. The resultant polymer has a reduced viscosity of 0.60, measured in a 0.5% solution of polymer in ortho-chlorophenol, and has an end group analysis of 23 —COOH and 101 —OH equivalents per $10^6$ grams of polymer. The polymer has a melting point of 254° C. and is white with a yellowness index of 104.

This polymer thus prepared is spun into yarn using a laboratory model one-inch extruder. After drawing to a ratio of 5.0 to 1, a 100 denier 19 filament yarn is obtained which has a strength of 5.5 grams per denier and an elongation at break of 25%. This yarn is wound on aluminum spools for light and heat degradation tests. It is noted that the yarn progressively discolors with exposure time. The degree of degradation is estimated by means of yellowness index tests on the yarn before and after exposure to light or heat radiation, as above specified.

YELLOWNESS INDEX (WITH 0.1 MOL PERCENT CATALYST)

Unexposed yarn _____ 106
Exposed in Fadeometer _____ 109
Exposed in oven _____ 111

EXAMPLES II–VII

Employing essentially the procedure of Example I, additional yarns are prepared containing other phosphonates. These experiments and the results thereof are summarized in Table I, below.

As the data of Table I indicate, the catalysts of the present invention afford polyester of high viscosity, high melting point, and good color and color stability.

By way of comparison, a polyester sample is prepared by the same procedure but using the prior art catalyst combination of 0.1 mol percent calcium acetate and 0.06 mol percent antimony trioxide. The yellowness index of the resultant yarn after 100 hours exposure in an oven at 165° C. is 122, indicating distinctly poorer thermal stability than the polyesters prepared in accordance with the present invention.

EXAMPLE XI

Fifty grams of dimethyl-5-tertiary-butyl-isophthalate and 75 grams of ethylene glycol and 0.07 gram of zinc phenyl phosphinate are charged to a 250-milliliter, 3-necked flask which is equipped with conventional Vigreaux column attached to a condenser and collector and a nitrogen sparge tube. The mixture is heated between 160° C. and 200° C. while 16 milliliters of methanol is distilled into the collector. The Vigreaux column is replaced with a short distillation head and 21 milliliters of ethylene glycol is distilled out of the mixture at 200° C.

The resulting prepolymer is placed in a 500-milliliter, 1-necked, round bottom flask, and three ¾-inch stainless steel balls are added. The flask is attached to a conventional Rinco evaporator spindle which is connected to a vacuum system. The flask is placed in a 200° C. oil bath with a pressure of 250 millimeters of mercury on the system and rotated 20 r.p.m. The temperature of the oil bath is raised in 1.5 hours to 290° C. Then the pressure is reduced to 0.1 millimeter mercury and the polymerization continued for 4 hours. The resultant polymer is transparent and water white. It has a reduced ortho-chlorophenol viscosity of 0.60. It does not have a definite melting point, but its glass transition temperature is 75° C. as measured by differential thermal analysis.

EXAMPLE XII

Two hundred and forty-four grams of 2,6-dimethyl naphthalene dicarboxylate, 9.70 grams of dimethyliso-

TABLE I

| | | | | | Yellowness index | | |
| | | Catalyst concentration (mol percent) | Reduced viscosity | Melting point, °C. | | Exposed 100 hrs. | |
| Example No. | Catalyst | | | | Unexposed | Fadeometer | Oven 165° C. |
| --- | --- | --- | --- | --- | --- | --- | --- |
| I | Calcium acetate and aluminum phenyl phosphinate | 0.1 | 0.62 | 253 | 108 | 112 | 115 |
| III | Sodium phenylphosphinate | 0.2 | 0.68 | 256 | 102 | 105 | 106 |
| IV | Calcium phenyl phosphinate | 0.2 | 0.58 | 254 | 106 | 110 | 118 |
| V | Tetramethylammonium 2-naphthyl phosphinate | 0.3 | 0.63 | 255 | 104 | 110 | 116 |
| VI | Stannic p-iodophenyl phosphinate | 0.3 | 0.62 | 254 | 106 | 112 | 114 |
| VII | Manganous 2,5-dimethylphenyl phosphinate | 0.2 | 0.60 | 255 | 104 | 114 | 115 |

EXAMPLES VIII–X

In order to demonstrate the effect of catalyst concentration on the properties of the resultant polyesters, the procedure essentially as described in Example I, above, is repeated using aluminum phenyl phosphinate as the catalyst in three (3) separate experiments at different concentrations. These experiments and the results thereof are summarized in Table II, below.

phthalate, 390 grams of ethylene glycol and 0.25 gram of calcium acetate are charged to a 1500-milliliter, 3-necked flask which is equipped with a nitrogen sparge tube, a Vigreaux column, distillation head, condenser, and receiver. The temperature is raised to 160° C. by means of an electric heating mantle at which point methanol begins to distill. The temperature is gradually raised to 200° C. and a total of 67 grams is collected. The

TABLE II

| | | | | Yellowness index | | |
| Example No. | Mol percent of catalyst | Reduced viscosity | Melting point, °C. | Unexposed | 100 hours Fadeometer | 100 hours oven 165° C. |
| --- | --- | --- | --- | --- | --- | --- |
| VIII | 0.1 | 0.54 | 256 | 108 | 111 | 115 |
| IX | 0.2 | 0.62 | 254 | 102 | 106 | 109 |
| X | 0.5 | 0.70 | 246 | 102 | 104 | 106 |

As the data in Table II indicate, in order to procure a polymer of preferred high melting point, it is desirable to employ the phosphinate catalyst in amounts below about 0.5 mol percent preferably between about 0.05 mol percent and about 0.3 mol percent.

The melting points are determined by differential thermal analysis. A 5–8 milligram sample is heated in an aluminum dish under nitrogen blanket at a temperature gradient of 4° C. per minute in a conventional Stone, Model 12B, differential thermal analysis apparatus. The melting point is taken as the temperature at which the first definite endotherm occurs.

Vigreaux column is replaced with a short distillation head and 113 milliliters of ethylene glycol is distilled while the pot temperature varies from 200–220° C.

Fifty grams of this prepolymer and 0.038 gram of manganous phenyl phosphinate are placed in a 500-milliliter, single-necked, round bottom flask. This is polymerized in a Rinco evaporator using the same conditions as described in Example 4, supra. The resulting polymer has a reduced ortho-chlorophenol viscosity of 0.60, end groups of COOH=24, OH=91 equivalent per 106 grams of polymer, and a melting point of 258° C. determined by differential thermal analysis.

The temperature conditions employed in the monomer-forming stage of the present invention will depend upon whether terephthalic acid or dialkyl terephthalate is employed as the di-acid moiety. Higher temperatures are generally required when free terephthalic acid is employed. Conditions of temperature in general in the monomer-forming stage will also depend to a certain degree upon the particular type and amount of catalyst present. The initial ester formation from dialkyl terephthalate may be conveniently carried out at atmospheric pressure and at a temperateure range between 150° C. and 260° C., preferably between 160° C. and 230° C. This reaction may also be carried out at pressures above or below atmospheric pressure. In the case of initial ester formation from free terephthalic acid, preferred temperatures will range between 220 and 300° C. and at pressures of 0–150 pounds per square inch gauge.

The polymerization reaction may be effected in liquid or solid phase. In the liquid phase, the reaction can be carried out at reduced pressure in the vicinity of 0.05–20 millimeters of mercury, 0.05–5.0 millimeters being preferred for optimum results. The reduced pressure is an expedient to remove from the viscous reaction mixture the free glycol which is evolved from the polymer as a result of the condensation reaction. Temperatures between about 230° C. and 290° C., and preferably between about 270° C. and 280° C., should be maintained during the polymerization step.

The duration of polymerization will depend upon the particular polyester composition and the specific catalyst employed and its concentration, temperature, and the intrinsic viscosity desired in the final polymer product. The method and apparatus employed will also influence the rate of polymerization. From the standpoint of commercial operation, it is preferable to effect polymerization in the shortest possible time. Consequently, catalyst concentrations are adjusted accordingly, and equipment providing for large surface area generation is employed to provide rapid polymerization rates and thereby avoid excessive degradation of the polymer which may be caused by undue exposure to polymerization conditions.

In designing equipment for batch-wise or continuous polymerization, it is very desirable to provide for rapid and continuous removal of the glycol from the polymerizing mass. Continuous processes tend to achieve this objective more readily, an objective which is more difficult to attain in batch equipment, such as an autoclave. In either process it is desirable to conduct the polymerization in apparatus which generates maximum surface area of the polymerizing mixture, thereby providing for the maximum exposure of the polymerizing mass to the effect of the vacuum in order to cause rapid removal of the glycol.

Clearly, the instant discovery encompasses numerous modifications within the skill of the art. Consequently, while the present invention has been described in detail with respect to specific embodiments thereof, it is not intended that these details be construed as limitations upon the scope of the invention except insofar as they appear in the appended claims.

We claim:

1. A linear fiber-forming polyester prepared from the reaction of an aromatic dicarboxylic acid or a dialkyl ester thereof and a glycol of reduced color and resistant to yellowing, said polyester containing a small but effective amount of a phosphinic compound soluble in molten polyester that is added to the monomer also for catalyzing the reaction of the formula

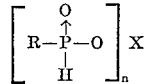

wherein R is aryl or alk($C_1$–$C_{12}$)aryl; X is a metal selected from Groups Ia, IIa, IIb, IIIb, IVa, IVb, Vb and VIIa of the periodic table, $NH_4$ or a quaternary ammonium cation; and $n$ is a value from 1 to 4.

2. The composition of claim 1 wherein the amount of phosphinic compound is between about 0.01 and about 0.5 mol percent, based upon mol of said compound per 100 mols of dicarboxylic acid-derived or dicarboxylic acid ester-derived aromatic moiety in the poleyster.

3. The composition of claim 2 wherein the amount of phosphinic compound is between about 0.05 and about 0.3 mol percent, based upon mol of said compound per 100 mols of dicarboxylic acid-derived or dicarboxylic acid ester-derived aromatic moiety in the polyester.

4. The composition of claim 1 wherein the linear fiber-forming polyester component is polyethylene terephthalate.

5. The composition of claim 1 wherein the phosphinic compound is an alkali metal aryl or alk($C_1$–$C_{12}$)aryl phosphinate.

6. The composition of claim 1 wherein the phosphinic compound is an alkaline earth metal aryl or alk($C_1$–$C_{12}$) aryl phosphinate.

7. The composition of claim 4 wherein the phosphinic compound is aluminum phenylphosphinate.

8. The composition of claim 4 wherein the phosphinic compound is sodium phenylphosphinate.

9. The composition of claim 4 wherein the phosphinic compound is calcium phenylphosphinate.

10. The composition of claim 4 wherein the phosphinic compound is tetramethylammonium 2-naphthylphosphinate.

11. The composition of claim 4 wherein the phosphinic compound is manganous 2,5-dimethylphosphinate.

12. A method of preparing a polyester prepared from the reaction of an aromatic dicarboxylic acid or a dialkyl ester thereof and a glycol of reduced color and reduced tendency toward color formation which comprises establishing in intimate admixture with said polyester a small but effective amount of a phosphinic compound soluble in molten polyester, said phosphinic compound being introduced in the preparation of said polyester also for catalyzing the reaction, the phosphinic compound having the formula

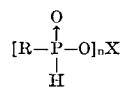

wherein R is aryl or alk($C_1$–$C_{12}$)aryl; X is a metal selected from Groups Ia, IIa, IIb, IIIb, IVa, IVb, Vb, and VIIa of the periodic table, $NH_4$ or a quaternary ammonium cation; and $n$ is a value from 1 to 4.

13. The method of claim 12 wherein the amount of phosphinic compound is between about 0.01 and about 0.5 mol percent, based upon mol of said compound per 100 mols of dicarboxylic acid-derived or dicarboxylic acid ester-derived aromatic moiety in the polyester.

14. The method of claim 12 wherein the amount of phosphinic compound is between about 0.05 and about 0.3 mol percent based upon mol of said compound per 100 mols of dicarboxylic acid-derived or dicarboxylic acid ester-derived aromatic moiety in the polyester.

15. The method of claim 12 wherein the polyester is prepared by direct esterification of an aromatic dicarboxylic acid and a glycol and subsequent polymerization of the resulting intermediate, the phosphinic compound being present during the direct esterification and polymerization steps.

16. The method of claim 3 wherein the phosphinic compound is introduced after the esterification step, the intermediate having a reduced viscosity of less than about 0.2.

17. The method of claim 12 wherein the polyester is prepared by an ester interchange reaction between a dialkyl ester of an aromatic dicarboxylic acid and a glycol and subsequent polymerization of the resulting bis-hydroxyalkyl aromatic dicarboxylate and prepolymer intermediates, the phosphinic compound being present during the ester interchange and polymerization reactions.

18. The method of claim 12 wherein the polyester is prepared by an ester interchange reaction between a dialkyl ester of an aromatic dicarboxylic acid and a glycol and subsequent polymerization of the resulting bis-hydroxyalkyl aromatic dicarboxylate and prepolymer intermediates and wherein the phosphinic compound is introduced after the ester interchange reaction step, the intermediates resulting from the ester interchange step having a reduced viscosity of less than about 0.2.

19. The method of claim 12 wherein the phosphinic compound is an alkali metal aryl or alk($C_1$–$C_{12}$) aryl phosphinate.

20. The method of claim 12 wherein the phosphinic compound is an alkaline earth metal aryl or alk($C_1$–$C_{12}$) aryl phosphinate.

21. The method of claim 12 wherein the phosphinic compound is sodium phenylphosphinate.

22. The method of claim 12 wherein the phosphinic compound is calcium phenylphosphinate.

23. The method of claim 12 wherein the phosphinic compound is tetramethylammonium 2-naphthylphosphinate.

24. The method of claim 12 wherein the phosphinic compound is manganous 2,5-dimethylphosphinate.

References Cited

UNITED STATES PATENTS

| | | | |
|---|---|---|---|
| 2,705,227 | 3/1955 | Stamatoff | 260—45.7 |
| 2,887,462 | 5/1959 | Van Oot | 260—45.75 |
| 2,981,715 | 4/1961 | Ben | 260—45.7 |
| 2,984,647 | 5/1961 | White | 260—45.75 |
| 3,322,716 | 5/1967 | Klein et al. | 260—45.7 |
| 3,446,766 | 8/1967 | Taylor | 260—22 |

FOREIGN PATENTS

| | | | |
|---|---|---|---|
| 1,013,573 | 12/1965 | Great Britain | 260—75 |

DONALD E. CZAJA, Primary Examiner

V. P. HOKE, Assistant Examiner

U.S. Cl. X.R.

260—45.7, 45.9, 75